United States Patent [19]
Blurton et al.

[11] 3,908,784
[45] Sept. 30, 1975

[54] AIR CUSHION DRILLING VEHICLE

[75] Inventors: Leon C. Blurton, Brea, Calif.;
Saverio J. Cina, Brooklyn, N.Y.

[73] Assignee: Global Marine Inc., Los Angeles, Calif.

[22] Filed: May 24, 1973

[21] Appl. No.: 363,523

Related U.S. Application Data

[62] Division of Ser. No. 130,462, April 1, 1971, which is a division of Ser. No. 12,778, Feb. 19, 1970, Pat. No. 3,693,729.

[52] U.S. Cl. .................................. 180/119; 180/116
[51] Int. Cl.² .......................................... B60V 1/11
[58] Field of Search ........................... 180/116, 119

[56] References Cited
UNITED STATES PATENTS

| | | | |
|---|---|---|---|
| 3,173,510 | 3/1965 | Smith | 180/119 |
| 3,227,234 | 1/1966 | Simon | 180/119 |
| 3,246,712 | 4/1966 | Mackie | 180/119 |
| 3,371,738 | 3/1968 | Bertin | 180/119 |
| 3,390,736 | 7/1968 | Thomas | 180/119 |
| 3,398,713 | 8/1968 | Hall | 180/119 X |
| 3,592,285 | 7/1971 | Noble | 180/119 X |

FOREIGN PATENTS OR APPLICATIONS

| | | | |
|---|---|---|---|
| 1,166,562 | 10/1969 | United Kingdom | 180/119 |
| 1,236,101 | 6/1971 | United Kingdom | 180/119 |

*Primary Examiner*—David Schonberg
*Assistant Examiner*—Terrance L. Siemens
*Attorney, Agent, or Firm*—Christie, Parker & Hale

[57] ABSTRACT

An air cushion vehicle particularly useful for a drilling rig for oil wells and the like employed in arctic environments having open water, muskeg, ice, snow, and tundra is described. The vehicle includes a watertight compartmented chassis or platform about which is provided a flexible skirt for cooperation with a surface for minimizing air leakage therebetween. Means are provided on the platform for supplying a volume of air under pressure to the region within the skirt for raising the pressure thereunder and thereby lifting the principal portion of the weight of the platform. Wheels are also provided for yieldably applying a force to the surface on which the vehicle rides to provide sufficient contact with the surface to provide control of the vehicle as it is towed. The means for supplying air comprises blowers selectively connected to prime movers, such as diesel engines, which are also selectively connectable to the draw works of the drill rig. The drill rig also includes a tower foldable between an erect drilling position and a lowered transporting position with the mode of folding such that the transverse center of gravity of the tower is not significantly shifted between these two positions.

5 Claims, 9 Drawing Figures

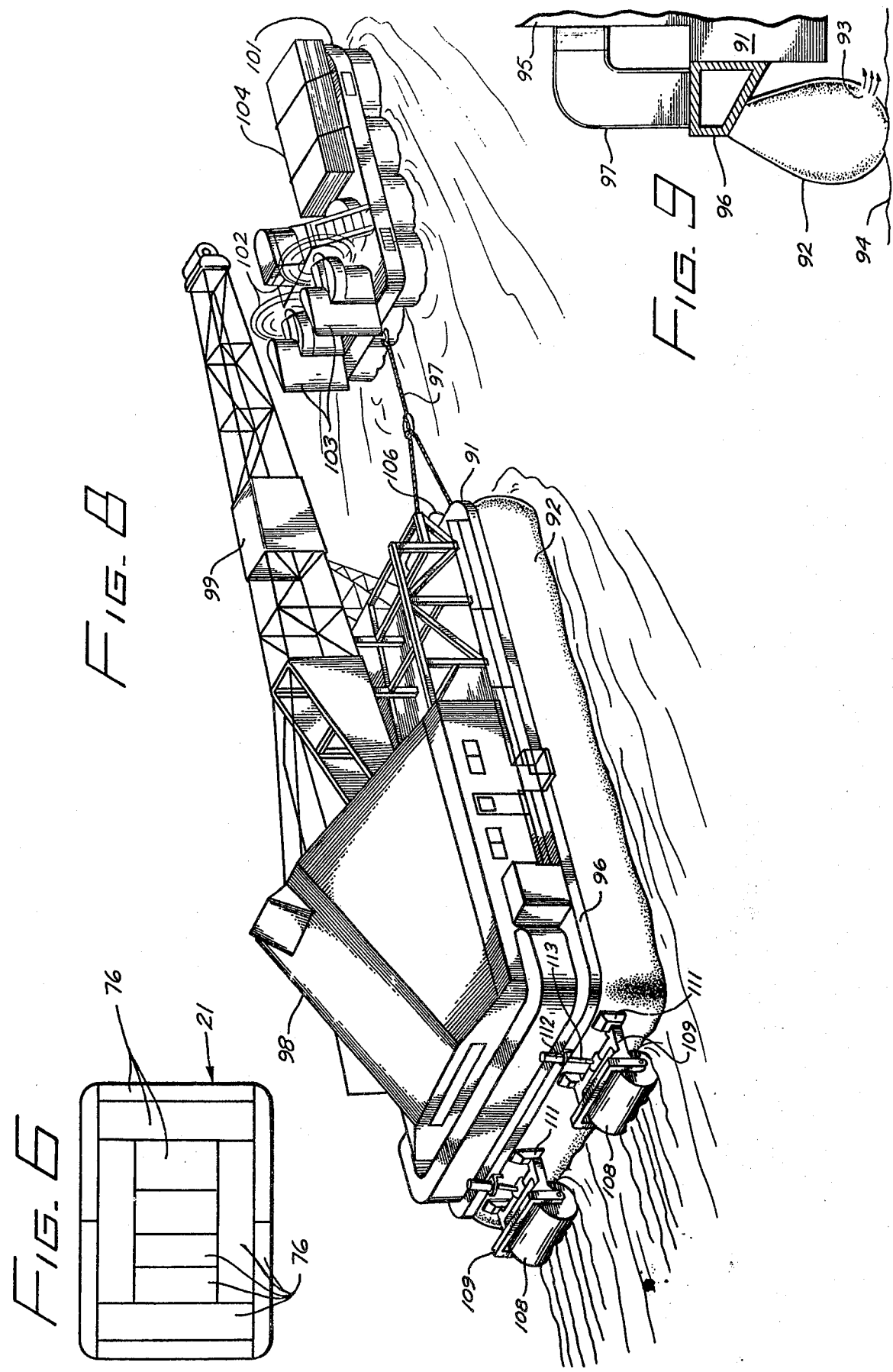

AIR CUSHION DRILLING VEHICLE

This is a division of application Ser. No. 130,462, filed Apr. 1, 1971, which is a division of application Ser. No. 12,778, filed Feb. 19, 1970, now U.S. Pat. No. 3,693,729.

BACKGROUND

In recent years there has been considerable interest and exploration for oil and gas reserves in arctic regions, particularly in Alaska and northern Canada. In order to exploit these established oil and gas reserves, wells must be drilled under quite adverse conditions associated with the low temperatures of the arctic environment. Some of the areas of interest are in water in areas protected from the open sea, and these areas may be open in part of the year and frozen over in other parts of the year. In other regions, a substantially permanent layer of ice is encountered. Snow is found in some regions; and still others are what is known in the arctic as muskeg, which is a boggy marsh unable to support ordinary land vehicles. Other areas of the arctic are tundra, which are open, treeless plains, having a blanket of organic material overlying a permafrost wherein a subsurface portion is permanently frozen and the surface portion is annually thawed to produce a mucky surface soil. Cutting roads through the insulating tundra exposes frozen soil beneath and destructive thawing may occur during the summer season.

Year round transportation over such surface is extremely difficult, particularly when the items being transported are heavy and bulky as is the equipment required for drilling oil wells. The techniques that have been employed to date in the arctic have, in the main, used aircraft and helicopters for transporting equipment which must therefore be in relatively small units and assembled at the drilling site. Clearly, weather conditions have a serious adverse effect on such airborne operations, and such transport is quite expensive. As one simple example, an on-site cost for diesel fuel in the arctic may be as much as $2. per gallon.

In order to minimize the cost of arctic operations, it is desirable to move a completely assembled drilling unit from drilling site to drilling site. The length of time that a drilling rig is on a site is normally in the order of from about ten days to about six months, with the most usual time being in the range of two or three months. Clearly, if it is necessary to disassemble and reassemble the drilling unit for transport to a new site with such frequency, a very large item of expense is involved.

One of the principal problems in moving a completely assembled drilling unit in the arctic involves the "footprint" pressure of the vehicle moving the unit, particularly in areas involving a layer of ice over water, or tundra, or muskeg during the summer months. Because of the very high footprint pressures of an assembled drilling rig, it is completely impractical to move such a rig on wheels, tracks or skies.

An air cushion approach for supporting a heavy mass, such as a drilling unit, with a low footprint pressure has been investigated in the past and discarded due to certain technical objections. Thus, for example, the efficiency of the power plant required for both lifting and propelling a large air cushion vehicle has been so low as to disuade acceptance by industry. Conventionally, the air cushion vehicle is driven by aircraft-type propellers which are noticeably inefficient, and, with the high cost of fuel, use of large vehicles in the arctic may be prohibitive.

The conventional air cushion vehicle is very difficult to maneuver since the air bubble on which it rests is nearly frictionless and directional control of the vehicle is difficult at low speeds. Thus, for example, when the vehicle is on a slope there is little, if anything, to prevent the vehicle from sliding down the slope. Similarly, in a high wind, such as is quite common in the arctic, the vehicle may be blown off its intended path. In order to obtain control of conventional air cushion vehicles, relatively high ground speed has been employed so that a substantial volume of air moves over control surfaces and the vehicle is essentially flown like an airplane and control may be lost at low speed when the velocity of airflow over control surfaces drops off. Travel at sufficient speed to maintain control over the unpredictable terrain of the arctic is dangerous since passage over rough ground or water, or open leads in the ice or the like, may cause loss of the air cushion, quickly resulting in a crash of the vehicle. Such crashes of conventional vehicles have resulted in loss of life of the operator and passengers.

It is, therefore, desirable to provide a relatively low cost assembled drilling rig on an air cushioned vehicle capable of being controlled at low speeds in an arctic environment.

BRIEF SUMMARY OF THE INVENTION

Therefore, there is provided in practice of this invention according to a preferred embodiment an air cushion vehicle including a chassis or platform for carrying a load such as a conventional assembled drilling rig and having a flexible skirt around the periphery of the platform for cooperation with a surface over which the vehicle is moved for minimizing airflow therebetween. Means are provided for supplying pressurized air within the skirt for maintaining sufficient pressure to support the weight of the vehicle, and means are provided for yieldably engaging the surface with sufficient force and friction for maintaining control.

DRAWINGS

These and many other features and advantages of this invention will be appreciated as the same becomes better understood by reference to the following detailed description of a presently preferred embodiment when considered in connection with the accompanying drawings wherein:

FIG. 6 shows schematically the modular construction of the apparatus of FIG. 1;

FIG. 8 is a perspective view of a second embodiment of a combined drilling rig and air cushion vehicle; and FIG. 9 is a detail of the skirt of the vehicle of FIG. 10.

Throughout the drawings like reference numerals refer to like parts.

DESCRIPTION

Figure 1:
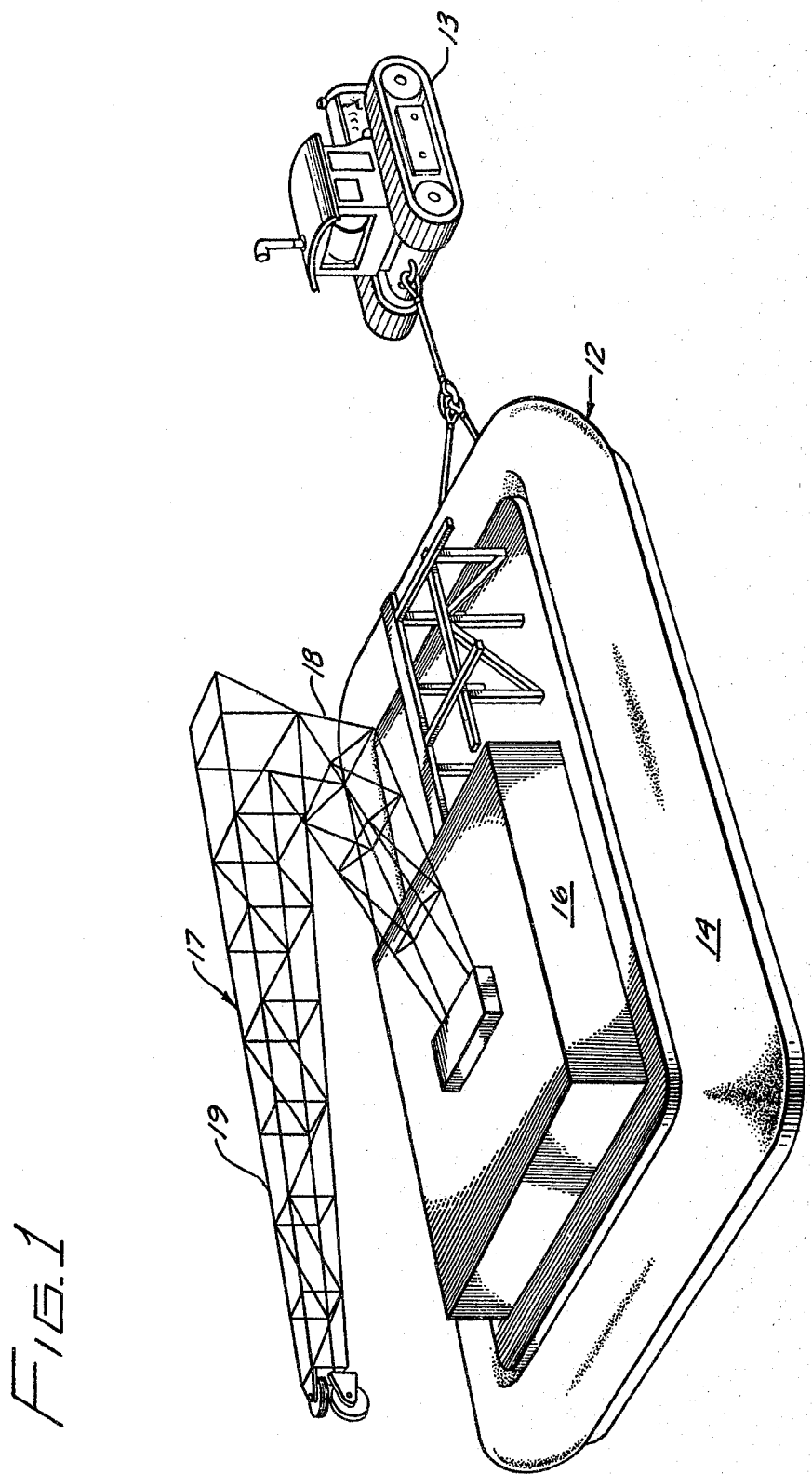
FIG. 1 illustrates in perspective a drilling rig being transported on an air cushion vehicle constructed according to principles of this invention.

FIG. 1 illustrates in perspective a combined drilling rig and air cushion vehicle constructed according to principles of this invention. As illustrated in this embodiment, a vehicle 12 is being towed by a conventional tractor 13 across a ice field or other arctic terrain. Surrounding the vehicle 12 is a flexible skirt 14 described in greater detail hereinafter within which a large volume of air at increased pressure is pumped in order to lift the vehicle on a cushion of air trapped within the skirt. A shelter 16 on the main deck of the vehicle provides a habitable environment for workmen on the drill rig and protects drilling equipment from the severe environment. A drilling tower 17 is mounted on the vehicle for handling the lengths of drill pipe employed in the conventional drilling and completion of an oil well or the like. The tower 17 in its drilling position (not shown in FIG. 1) is erect above the vehicle in the familiar posture of oil wells. During transport, however, in order to maintain the overall center of gravity of the vehicle as low as possible, and to lower the center of pressure of wind forces on the vehicle, the tower is folded to a lowered position, as pointed out hereinafter. In a preferred arrangement, the tower has a lower section 18 and an upper section 19 which fold relative to each other as the lower section 18 folds down so that the transverse center of gravity of the tower is not greatly shifted between the raised and lowered positions.

Figure 2:
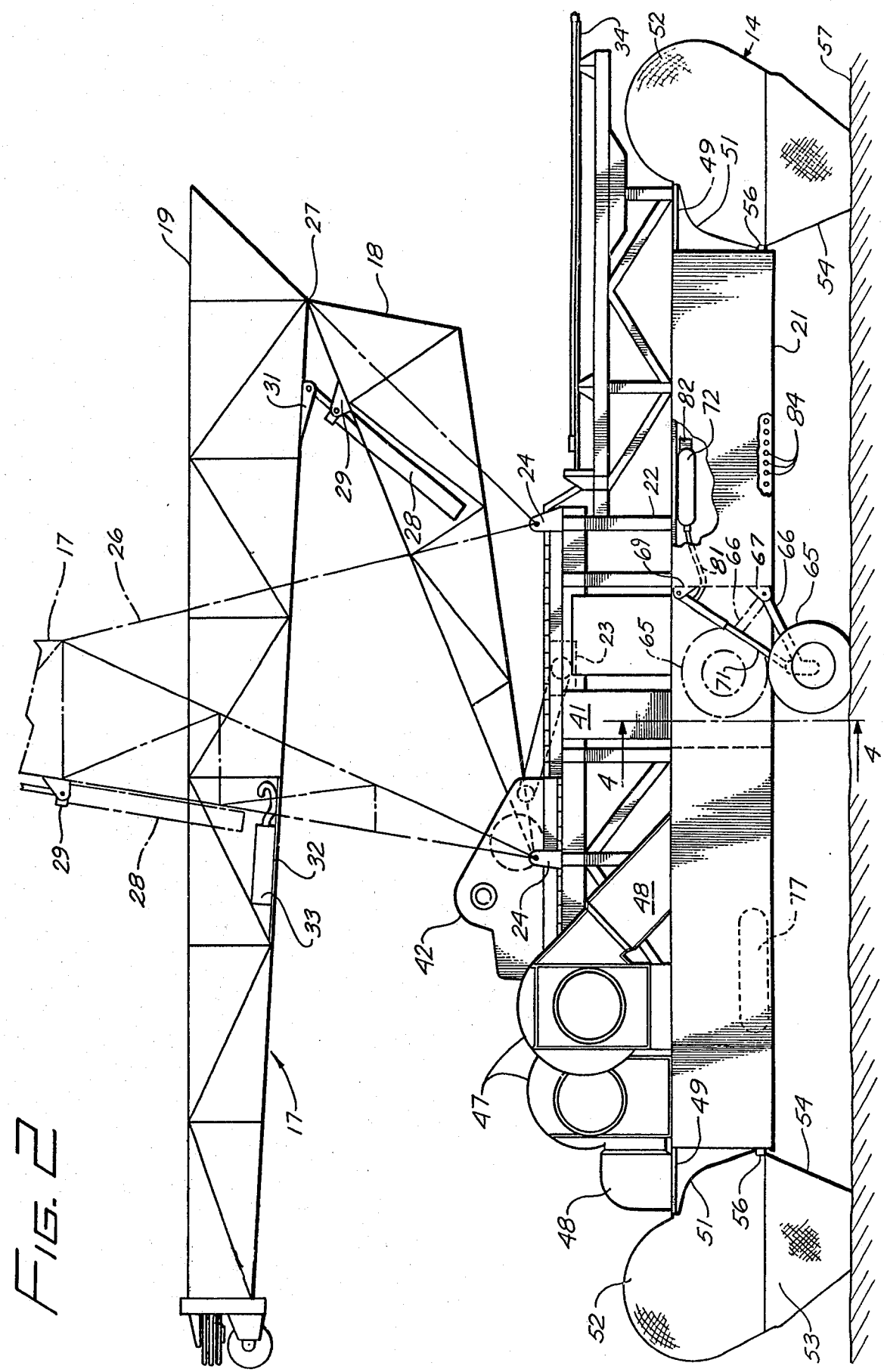
FIG. 2 is a side partial cross section of the apparatus of FIG. 1.
Figure 3:
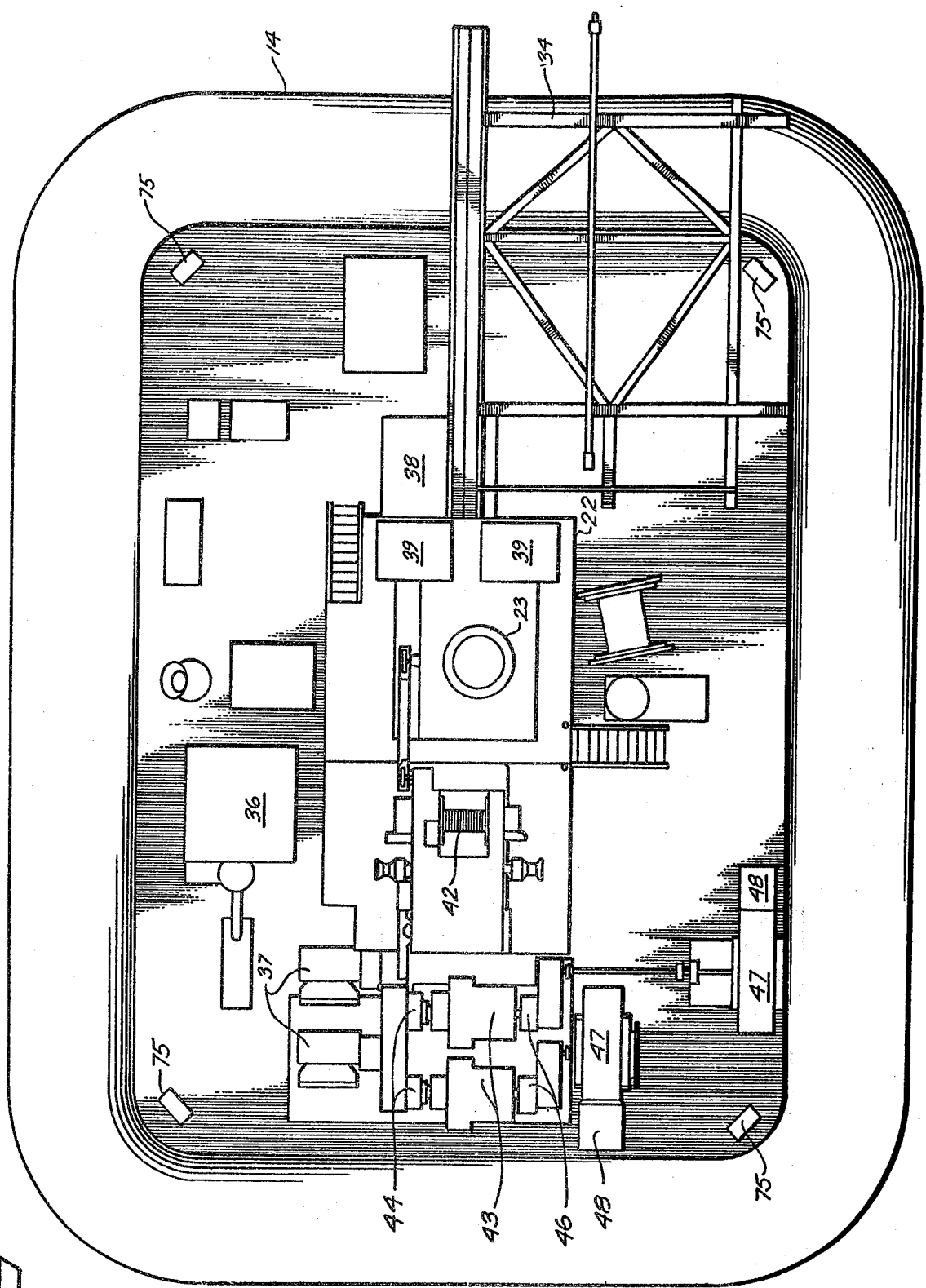
FIG. 3 is a top view of the apparatus of FIG. 1.

FIGS. 2 and 3 illustrate in longitudinal cross section and top views, respectively, many of the construction details of the apparatus illustrated in perspective in FIG. 1. In both of these views the shelter 16, illustrated in FIG. 1, is removed to show elements of the equipment which would otherwise be protected and hidden by the shelter. The main body of the vehicle comprises a platform or chassis 21 described in greater detail hereinafter. In a typical embodiment, the platform is about 64 feet long and about 46 feet wide, which provides sufficient room for the equipment required for drilling and completing an oil well.

In a typical arctic situation, a second somewhat similar vehicle would be stationed nearby for providing transport and storage of drill mud, cement, drill pipe, and the like. A third habitat vehicle having structures for housing crew members would also be stationed nearby. In most situations the transport and storage vehicle and the habitat vehicle would be located contiguous to the illustrated vehicle having the drill rig; however, on ice over water the other vehicles may be stationed as far away as 200 yards in order to permit the stresses induced by the weight of vehicles at the drilling location to be distributed through the layer of ice.

The total weight of the vehicle, including the drill rig and various expendables when set up for drilling, applies a weight of about 275 pounds per square foot which can safely be supported on a layer of ice about five feet thick. As pointed out hereinafter when the vehicle is traveling the footprint pressure is appreciably less due to decreased total weight because of the absence of expendables and a larger footprint area so that the traveling footprint pressure is about 110 lbs per square foot (0.8 psi), which is approximately twice the footprint pressure of the usual air cushion vehicles presently employed at relatively high velocities.

Mounted on the platform or chassis 21 is a so-called sub-base 22, which provides a raised deck for workmen during drilling operations and which supports a portion of the equipment required for drilling operations, such as, for example, the approximately centrally located rotary table 23 conventionally employed in drilling operations. Mounted on the sub-base 22 are foundations 24 on which the lower segment 18 of the tower 17 is supported (the tower 17 is omitted from FIG. 3 for clarity).

The tower 17 is a substantially conventional folding tower such as available from the Lee C. Moore Company. Such a tower has a lower segment 18 pivotally mounted on a pair of foundations 24 so as to be pivotable between a lowered traveling position as seen in solid in FIG. 2, and a raised operational position as seen in phantom in FIG. 2. When the tower is in its raised position, legs 26 connected to a pair of the foundations 24, support the lower segment 18 in its raised position. The legs 26 are disconnected and pivoted out of the way or removed when the tower is folded down for transporting as in the position illustrated in solid in FIG. 2.

When the tower is folded down the upper segment 19 pivots about a pivot 27 so as to fold back across the lower segment 18 as controlled by a hydraulic actuator 28. The cylinder of the actuator 28 is connected to the lower segment 18 of the tower by a trunnion 29 and a piston is pivotally connected to the upper segment 19 by a bracket 31.

The otherwise conventional tower 17 is modified only by providing a plate 32 on one side of the upper tower section 19 so that the heavy pulley block and hook 33 can be snubbed over and lashed in place on the plate for transporting the tower in a lowered position. When the block 33 is in the lashed position as shown in FIG. 2 and the tower is folded, as illustrated in solid in FIG. 2, its overall transverse center of gravity is substantially directly below the center of gravity of the elevated tower. In this manner, the overall center of gravity of the vehicle is not greatly shifted whether the tower is in a raised or lowered position. This enables the footprint weight distribution to be predicted and controlled when the tower is raised so that the weight distribution on the surface beneath the platform is fairly uniform to prevent tilting. Likewise, the center of gravity remains substantially centrally located with the tower lowered so that the vehicle remains balanced when traveling on a cushion of air.

It is desirable in an air cushion vehicle to maintain the center of gravity as low as possible during travel to enhance the stability of the vehicle. The tower, which may be over 120 feet tall, is a relatively heavy apparatus and lowering is highly desirable for improving the traveling stability of the vehicle. Similarly, when the tower is raised, the overturning effect of wind pressure on the tower is much greater than when the tower is lowered and, therefore, traveling with the tower lowered is much safer in the winds so common in the arctic.

A conventional pipe rack 34 is provided on the platform 21 for accepting lengths of drill pipe employed in drilling operations. A tank 36 for drilling mud is also provided on the platform, and in a position approximately opposite the center of gravity from the pipe rack 34, so that substantial amounts of pipe and mud in their respective receptacles do not grossly change the over all center of gravity of the platform. Other conventional well drilling equipment, such as, for example, pumps 37, an active mud tank 38, pipe set backs 39, and blow-out preventer control equipment 41 is also positioned on the main deck of the platform in a distribution that assures a vehicle center of gravity near its geometrical center.

A conventional drill rig draw works 42 is positioned on the sub-base 22 for handling the cables commonly employed in oil well drilling. The draw works 42 are powered by a pair of prime movers 43 which are preferably diesel engines which power not only the draw works but also the pumps 37 and most other equipment commonly employed in drilling operations. The engines 43 are connected to the draw works and other equipment by way of a pair of clutches 44 so that they can be selectively connected and disconnected as desired. A second pair of clutches 46 are also connected to the diesel engines 43 so that the engines can be selectively connected to a pair of high volume low-pressure blowers 47. Each of the blowers 47 is connected to an air duct 48 which leads the air through the edge of the platform which is in the form of an outwardly extending flange 49 having intermittent braces 51 for weight support.

Air from the ducts 48 enters an upper plenum 52 of the skirt 14. As may be seen more clearly in the perspective view of FIG. 7, the plenum 52 having an edge connected to the flange 49 continues as an open passage entirely around the platform so that air entering from the two ducts 48 is conveyed within the skirt entirely around the vehicle. The lower portion of the skirt 14 includes a plurality of webs 53 lying in a substantially vertical plane and connected in one corner to the platform 21. The outer edge of each web 53 is connected to the outer exposed portion of the skirt and the inner edge is connected to an inner skirt 54 which extends entirely around the platform and is fastened thereto at its upper edge by a bar 56. The bottom portion of the skirt 14 is completely open adjacent the ground 57, for example, so that air can leave the skirt through the open bottom portion.

The skirt 14 is fabricated of a flexible material, and because of the low temperature environment encounterd in the arctic, care must be taken in selecting a flexible material that will not harden or become brittle at low temperatures. Polyurethane impregnated fabric materials, which remain flexible at arctic temperatures, are suitable for use in the skirt.

Figure 7:
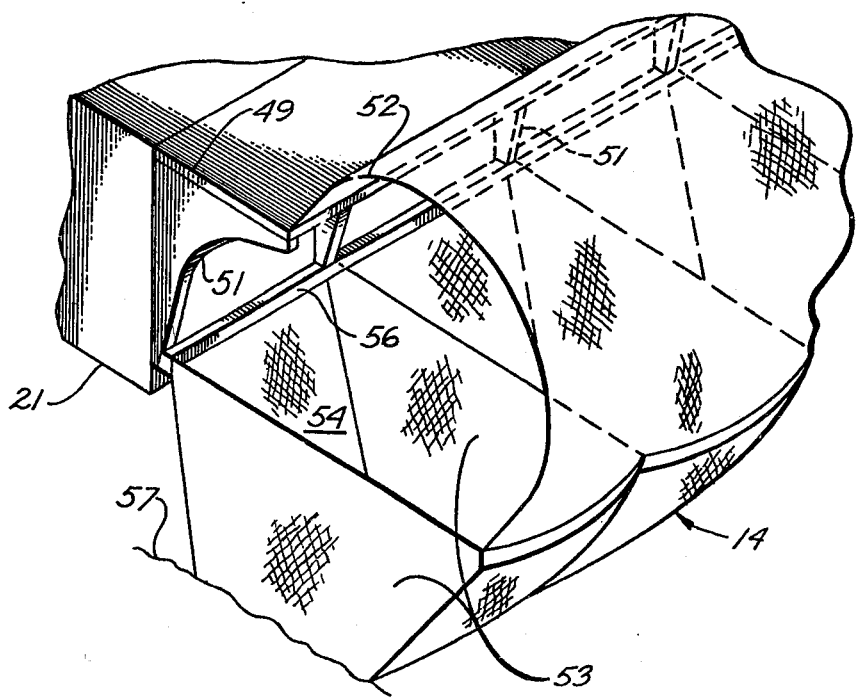
FIG. 7 is a detail of the skirt region of the vehicle of FIG. 1.

In operation, air is injected into the plenum 52 through the ducts 48 and the upper portion of the skirt is caused to billow outwardly as illustrated in FIGS. 2 and 7 under the urging of the increased air pressure. The webs 53 constrain the lower portion of the skirt and maintain it in the general configuration illustrated. Air passes downwardly from the plenum 52 through the spaces between the webs 53 which may, for example, be one or two feet apart, and escapes between the lower edges of the skirt and the ground 57. A portion of the air passes under the inner skirt 54 to increase the air pressure underneath the platform 21, and the principal portion of the air escapes beneath the outer skirt 14 into the environment. The air pressure built up within the inner skirt 54 and under the platform is substantially the same as the air pressure within the plenum 52, and as this builds up it applies a force against the bottom of the platform which serves to raise the platform to a position as illustrated in FIG. 2. When so raised, the bottom of the platform is about five feet above the ground in the illustrative embodiment, and it is found that the obstacles about 2 ½ feet high can readily be cleared with such an arrangement.

As air is applied within the skirt 14, it does not continue indefinitely to increase pressure and further raise the platform above the ground, since as the platform raises the outer edge of the skirt will clear the ground and air will "leak" out around the skirt. An equilibrium clearance above the ground is quickly established with the leakage around the skirt equalling the volume of air inserted into the plenum by the blowers 47. With a vehicle of the size and weight herein described and illustrated in a preferred embodiment, the outer edge of the skirt may be as much as three inches from the ground surface when a full volume of air is escaping therefrom.

As the vehicle moves and encounters obstacles, a portion of the skirt is pushed aside and raised to pass over the object, and some added leakage of air may occur as the object is passed. Because of the inner skirt 54 and the large cross section of the plenum 52, there is no large change in air pressure beneath the platform and the platform is not lowered appreciably. When the skirt is lifted on one side of the platform, or for some other reason additional air leaks from one side, a very slight pressure gradient occurs under the platform and a slight degree of tilt results, which brings the skirt on that side in closer proximity to the surface and pressure and position equilibrium are very quickly restored.

For the same reason, substantial displacement in the center of gravity of the platform and its contents from the geometric center while it is supported on the air cushion can be readily tolerated. This merely brings the "heavy" side of the platform slightly closer to the ground and hence somewhat closes the gap between the skirt and the ground on that side as compared with the opposite "light" side of the platform and the platform travels smoothly at a slight tilt normally only a few inches in many feet. It is found with a platform of the size herein involved that a displacement of the center of gravity of as much as five feet from the geometric center can be tolerated; however, it is preferred to maintain the center of gravity much closer to the geometric center in order to provide a tolerance to accommodate other disturbing influences, such as roughness of the terrain, ground slope, and wind loading.

Figure 4:
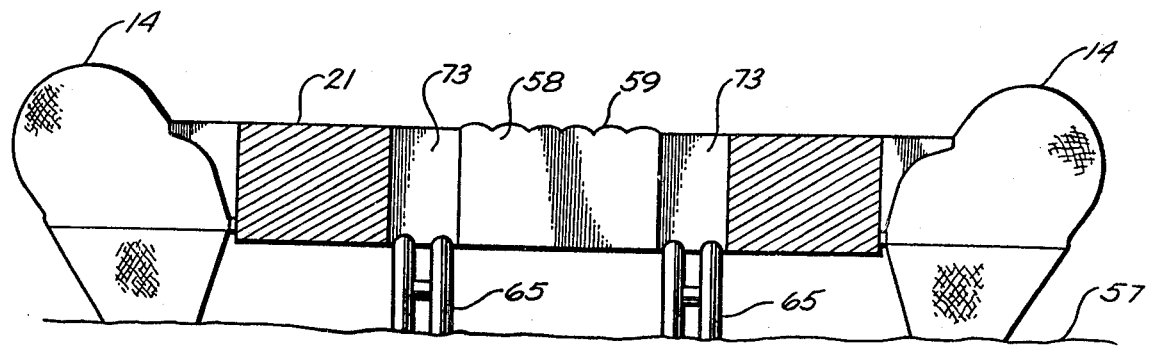
FIG. 4 is a schematic transverse cross section of the apparatus of FIG. 1.
Figure 5:
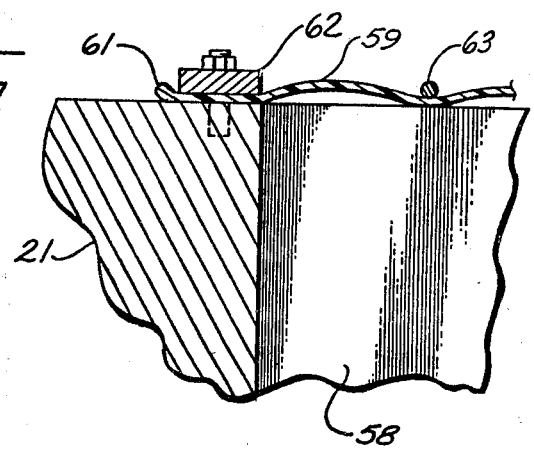
FIG. 5 is a detail of a seal on the drill well of the apparatus of FIG. 1.

Located directly beneath the drill tower 17 is a drill web 58 which is rectangular hole extending through the platform 21 to provide clearance for the equipment employed for well drilling. In order to move the vehicle on a cushion of air, a seal must be provided over the drill well. Such a seal is illustrated in FIG. 4 and in FIG. 5 which comprises a fragmentary view of an edge of the well 58, wherein the upper surface of the drill well is covered by a sheet 59 of flexible plastic impregnated fabric similar to that employed in the skirt. An enlarged welt 61 around the edge of the sheet 59 prevents the sheet from sliding from under a metal bar 62 bolted to the deck of the platform 21. Air pressure beneath the plastic sheet 59 billows it upwardly and in order to minimize stress on the edges of the sheet, a network of cables 63 are lashed over the sheet. If desired, a rigid cover could be employed in lieu of the flexible sheet 59; however, the problems of handling a heavy rigid cover and storage during drilling operations when the cover is not needed make the flexible sheet arrangement preferred.

As mentioned hereinabove, a vehicle supported solely on a cushion of air is essentially frictionless and quite difficult to control at low speeds since it will drift from position under wind pressure or down a relatively gradual slope. Therefore, means are provided for resiliently engaging the surface below the platform to provide frictional contact and prevent side slipping. In a way, the effect is analogous to that of a centerboard on a sailboat which provides substantial resistance to lateral slipping of the sailboat by engagement with the water. A sailboat without a centerboard is readily subject to side slippage under wind pressure.

In the preferred embodiment, the means for engaging the ground, ice or other surface beneath the vehicle comprises a pair of sets of wheels 65 mounted on support bars 66 independently pivotally connected to the platform at pivots 67. The cylinder 68 of a hydraulic actuator is pivotally connected to the platform at a pivot 69, and the piston 71 of the actuator is connected to the support bar 66 adjacent the wheel 65 in each set. The hydraulic actuator is connected to a conventional pneumatic accumulator 72 by a hydraulic line 81 for resiliently applying pressure to the hydraulic actuator. Thus, the wheels 65 can be extended to the position shown in solid in FIG. 2, or can be retracted to the position shown in phantom by varying the pressure in the pneumatic accumulator 72.

During travel, the wheels 65 are normally in the extended position so as to contact the surface and provide stabilization and control of the vehicle. While on the drilling site, the wheels are not needed and are retracted. By applying pressure to the hydraulic actuator 68 by way of a pneumatic accumulator 72, a substantially constant pressurre can be provided between the wheels 65 and the ground 57, and substantial independent vertical articulation of the wheels can be accommodated as obstructions are encountered by one set of wheels or the other, or even by both sets.

The pressure that the wheels apply to the ground or other surface beneath the vehicle is within the control of the operator by way of a conventional pressure regulator 82, who need set only the pneumatic pressure in the accumulaotr in order to maintain a contact of constant force despite surface irregularities. Normally, the force applied to the ground by each of the two sets of wheels employed in a preferred embodiment is in the order of 20,000 pounds, although less may be employed under favorable conditions of wind and terrain and more may be required in adverse winds and on side slopes. When traversing muskeg or tundra in thawed condition, the wheel pressures can be reduced as necessary for avoiding damage to the terrain. In any event, the proportion of the weight of the vehicle and drill rig supported by the wheels is a minor fraction of the total, normally less than about 10 percent, and the major portion of the vehicle weight is supported by the air cushion. The wheels are principally for control of the vehicle in the prevention of side slippage, and would apply too high a footprint pressure for most arctic applications if they supported a substantial fraction of the total vehicle weight.

As more clearly seen in the schematic view of FIG. 4, the two sets of wheels 65 are arranged in wells 73 on either side of the drill well 58. They are so located as a convenience in fabrication, and they are actually slightly forward of the center of gravity of the vehicle. The line between the sets of wheels 65 should be approximately under the center of gravity, however, some tolerance in position is acceptable since they do not support a substantial fraction of the vehicle weight and have little effect on the attitude of the vehicle. Two sets of wheels on the same axis under the vehicle are preferred since this permits turning on a very short radius without any requirement for castering the wheels. If more than two sets of wheels on different axes were employed, the same short radius of turning could not be provided without the additional complexity of providing castered wheels. This is of interest since the air cushion vehicle provided in practice of this invention is towed by another vehicle and a short turn radius is desirable to avoid any towing problems.

Although wheels are greatly preferred as the surface engaging means since large diameter pneumatic or metal tires can be provided for low footprint pressure, other arrangements can be employed, such as, for example, skis or track laying arrangements. Wheels are, however, preferred since they do not require any attitude adjustments to be made as the wheels are raised and lowered as would be the case if skis or some track laying arrangements were employed. Wheels are also simple, inexpensive and reliable. When the vehicle is employed over water, the wheels may not provide sufficient engagement with the surface any may be supplemented by centerboard arrangements to minimize side slippage due to wind forces, although it is preferred to avoid travel over water in high winds.

As illustrated in FIG. 1, the air cushion vehicle would normally be towed by a tractor; towing can also be by a second air cushion vehicle or a helicopter, if desired. Either of these latter two modes may be preferable when the vehicle is towed over water, or ice over water, since they also have low footprint pressure as compared with a tractor. In particularly steep terrain, winches 75 mounted on the deck of the platform can be employed to manipulate cables connected to objects solidly affixed to the terrain, such as trees, piling or the like. Such cables can be employed independently to move the air cushion vehicle at a slow rate or can be used to supplement the towing power of a tractor or the like. They are also useful on steep side slopes to supplement the wheels in preventing side slippage.

As mentioned briefly hereinabove, the air cushion vehicle is made sufficiently buoyant to float stably in water. In order to provide flotation and for airborne shipping, if desired, the platform is preferably constructed in a plurality of watertight modules 76 as illustrated in the top schematic of FIG. 6. This view shows schematically an arrangement of individual modular elements for the platform 21 in which each module 76 is a hollow box welded up from sheet steel with reinforcing ribs as required. The individual modules are merely bolted together to form the desired platform. It will be noted that in the illustrated embodiment only four module shapes or sizes are required to assemble the entire platform. These module sizes and shapes are conveniently selected to permit the assembly of platforms of other sizes using the same basic modules. The individual modules 76 are watertight and may be separately internally compartmented in order to provide damage control and safety in case of accidental rupture of one of the compartments of the module.

In a preferred embodiment, the buoyancy of the modules is selected so that the entire platform will safely float even when completely loaded with expendables for drilling operations so that there is no substantial safety problem in case the vehicle and drilling rig should break through ice while conducting drilling operations. It is apparent that if the vehicle will float safely under these conditions it will also float readily when in its traveling mode with approximately half the weight of the drilling mode. The importance of a center of gravity low and over the geometric center is apparent in a floating vehicle.

The interior of the modules 76 provides a convenient place for storing fuel for drilling operations, and toward this end fuel bags 77 may be positioned within one or more of the modules for containing diesel fuel and the like. Fuel bags are flexible rubber or plastic containers within which fuels are conventionally stored so as to collapse when fuel is withdrawn therefrom. These are desirable since they are convenient and lightweight for such application. The fuel bags in the modules may also be employed during transportation of the vehicle to provide some ballasting for shifting the center of gravity if desired.

Air cushion vehicles have been employed in the arctic using an air cushion of about 58 pounds per square foot (0.4 psi) and are propeller driven at speeds of up to about 60 miles per hour. As mentioned hereinabove, reasonable speed must be maintained in conventional air cushion vehicles in order to provide control. The heavy masses involved in drilling equipment effectively precludes speeds of this nature and a somewhat higher air cushion pressure must be maintained to keep the area of the air cushion within reasonable proportions. It has been found that air cushion pressures for vehicles such as those herein described having drill rigs thereon can be as high as about 110 pounds per square foot (0.8 psi). Such pressures can be employed in fine sediments and in water under a slowly moving vehicle without severe scouring effects. With a pressure of this magnitude supporting a vehicle having a drill rig thereon, the surface of water is depressed about 18 inches beneath the air cushion and the volume of air escaping around the periphery of the skirt causes considerable spray. A similar effect may be observed in powdered snow or dry tundra; however, it has not been observed that such a slow moving vehicle scours the surface to the point that it "digs itself into a hole" so that it cannot be towed along. This is at least partly due to the large size of the vehicle and its substantial clearance above the surface permitting it to clear and readily pass over rather large obstructions.

Operation of a conventional air cushion vehicle is difficult since it is on a substantially frictionless support and traveling at low speeds is not readily accomplished. With a vehicle the size of the drill rig, a ground speed in the order of two to ten miles per hour is employed which is too low for reliable control if the vehicle were solely on an air cushion. The wheels, however, prevent side slippage and forward progress is fully within the control of the tractor operator. The only control required on the air cushion vehicle itself is setting of the pressure in the pneumatic accumulator powering the hydraulic actuator which sets the contact pressure between the wheels and the surface, and setting of the blowers to maintain a predetermined pressure within the skirt. There is very little criticality in either of these settings since the former merely varies the footprint pressure locally and the latter merely causes the vehicle to ride higher or lower depending on whether the blowers are set at a higher than optimum or lower than optimum speed, and no great change is made for substantial variations in blower pressure.

In order to move the air cushion supported drill rig from one drilling site to another, any remaining expendables are removed from the platform in order to minimize the weight, and the drill tower is lowered as hereinabove described and illustrated. The diesel engines are disconnected from the draw works and connected to the blowers, and pneumatic pressure is applied to the hydraulic actuators of the surface engaging wheels. As the blowers inflate the skirt and increase the air pressure beneath the platform, a pressure is soon reached where the platform is lifted off of the surface so as to ride on a cushion of air. The wheels, under the resilient urging of the hydraulic actuator, remain in contact with the surface at the selected force. As soon as the vehicle is stabilized, towing to a new site can commence.

In much of the arctic, such as over open ice or water, through most muskeg, and over most tundra, very little trail preparation is required. If needed, however, bulldozers can be employed to scrape major obstructions from the path and provide a reasonable grade for travel of the platform from one site to another. This is conveniently done while the drill rig is employed in drilling operations, and the bulldozer employed for trail preparation can also be employed for towing the vehicle to the new site. It should be recalled that the air cushion vehicle hereinabove described and illustrated has a terrain clearance of about five feet and obstructions as much as 2 1/2 feet high can readily be cleared during travel so that careful trail preparation is not mandatory.

As mentioned hereinabove, the individual modules 76 of the platform 21 are of such a size that they fit within existing aircraft or can be carried by large helicopters so that the platform can be transported by air and assembled at a remote location if desired. The other equipment on the platform is clearly air transportable also. This is, however, not the most economical way of transporting a heavy, bulky item of this nature, and it is preferred to completely assemble the vehicle and drilling rig at a convenient location and transport the completely assembled apparatus to the site by ship. It will be noted that the 65-foot-long vehicle described in a preferred embodiment has a length about equal to the beam of a ship suitable for transporting such equipment.

FIG. 8 illustrates another embodiment of drill rig and air cushion vehicle constructed according to principles of this invention. As illustrated in this embodiment, a platform or chassis 91 is surrounded by a flexible skirt 92 in the same general manner as in the preferred embodiment hereinabove described. A cross section of the skirt and an edge of the platform 91 is illustrated semischematically in FIG. 9. As seen therein the skirt in this embodiment comprises a long plenum like section extending along the edges of the vehicle and may be one member or may be subdivided into compartments intermittently as desired. Vent holes 93 on the inward side 92 pass air from the interior of the skirt to the region beneath the vehicle chassis 91. Air flows from this region between the skirt 92 and the ground 94 or the surface over which the vehicle is riding. Since there is a substantial air flow between the skirt and the ground the skirt seldom contacts the ground directly and there is no substantial problem of wear of the skirt.

Air is provided to the skirt from one or more blowers 95 from which it is lead to a plenum 96 extending completely around the vehicle by a duct 97.

Referring again to FIG. 8, a shelter 98 mounted on the vehicle provides a habitable environment for men and equipment operating the drill rig. A conventional drilling tower 89 is mounted on the platform so as to be pivotable between a lowered position illustrated in FIG. 8 for transport and an erected position (not shown) for drilling operations. It might be noted that the drilling tower illustrated in FIG. 8 which merely pivots down to a substantially horizontal position, rather than folding as in the preferred embodiment, is a somewhat smaller tower for handling shorter lengths of drill pipe and for drilling wells to shallower depths than the folding tower.

As in the previously described embodiment the drill rig on the air cushioned vehicle is towed from site to site rather than being self-propelled. In this instance, the towing is provided by an additional air cushion vehicle 101, which includes a pair of propellers 102 for providing forward propulsion, and movable control surfaces or rudders 103 for directional control and steering of the air cushion vehicle. In addition to providing towing for the vehicle supporting the drill rig, the air cushion vehicle 101 may also provide a bed for transporting cargo 104.

In order to provide stability for the air cushioned vehicle supporting the drill rig, means are provided for engaging the ground or other surface over which the vehicle travels. In this embodiment a fraction of the vehicle load is applied to the ground outside the skirt by means of large pneumatic rollers. A single central roller 106 is provided at the forward end of the vehicle between arms of the tow bar 107. A pair of similar rollers 108 are provided at the back end of the vehicle for contacting the ground with a preselected pressure. Each of the rollers 108 is supported on a rigid frame 109 having arms extending through the flexible skirt 92 and pivotally mounted on the chassis of the vehicle so that it is free to translate vertically. Flexible bellows 111 are provided between the frame 109 and the skirt 92 for preventing substantial air leakage and also accommodating motion of the frame 109. A hydraulic actuator 112 has its piston 113 connected to frame 109 for applying a selected downward force as controlled by a pneumatic accumulator so that the rollers contact the ground with a selected pressure.

By providing rollers outside the skirt in this embodiment there is some sacrifice in the turning radius available, however, in some situations this is acceptable for the slightly lower footprint pressure available in such an arrangement. Rather large size rollers can be accommodated outside the skirt, whereas when wheels are employed beneath the skirt they must be somewhat smaller so that they can be readily retracted when not in use without substantially reducing the buoyancy of the overall vehicle.

Although only two embodiments of drill rig supported on an air cushioned vehicle have been described and illustrated herein many modifications and variations will be apparent to one skilled in the art. It is therefore to be understood that the invention may be practiced otherwise than as specifically described, limited only as is indicated in the appended claims.

What is claimed is:

1. An air cushion vehicle comprising:

a load supporting chassis;

flexible skirt means around the periphery of the chassis and depending therefrom for cooperation with a surface for minimizing air flow therebetween;

means on the chassis for supplying air under pressure within the skirt means for maintaining sufficient pressure to support a major portion of the weight of the chassis and load;

a plurality of wheels within the skirt means and beneath the vehicle; and means for yieldably biasing the wheels downwardly from the vehicle for yieldably engaging a surface with a predetermined substantially constant force equal to a minor portion of the weight of the chassis and load.

2. An air cushion vehicle as defined in claim 1 wherein the means for resiliently biasing comprises:

a hydraulic actuator for urging the wheels downwardly; and a pneumatic accumulator for operating the hydraulic actuator.

3. An air cushion vehicle as defined in claim 1 further comprising;

means for towing the air cushion vehicle from one location to another.

4. An air cushion vehicle comprising:

a load supporting chassis;

flexible skirt means around the periphery of the chassis and depending therefrom for cooperation with a surface for minimizing air flow therebetween;

means on the chassis for supplying air under pressure within the skirt means for maintaining sufficient pressure to support a major portion of the weight of the chassis and load;

a first wheel;

means for biasing the first wheel downwardly from the vehicle for yieldably engaging a surface with a predetermined substantially constant force equal to a minor portion of the weight of the chassis and load;

a second wheel substantially coaxial with the first wheel, the center of gravity of the air cushion vehicle being approximately over a coaxial line between the first and second wheels; and means for biasing the second wheel downwardly from the vehicle for motion independent of motion of the first wheel for yieldably engaging a surface with a predetermined substantially constant force equal to a minor portion of the weight of the chassis and load.

5. An air cushion vehicle comprising:

a load supporting chassis;

flexible skirt means around the periphery of the chassis and depending therefrom for cooperation with a surface for minimizing air flow therebetween;

means on the chassis for supplying air under pressure within the skirt means for maintaining sufficient pressure to support a major portion of the weight of the chassis and load;

a plurality of wheels positioned outside the skirt means;

means for yieldably biasing the wheels downwardly from the vehicle for yieldably engaging a surface with a predetermined substantially constant force equal to a minor portion of the weight of the chassis and load comprising:

a mounting frame for each wheel, said mounting frame being movably connected to the chassis within the skirt means, and a fluid actuator for moving the mounting frame; and sealing means for preventing air leakage between the skirt means and the mounting frame.

* * * * *